US 6,592,849 B2

United States Patent
Robinson et al.

(10) Patent No.: US 6,592,849 B2
(45) Date of Patent: Jul. 15, 2003

(54) CHEWING GUM TO CONTROL MALODOROUS BREATH

(75) Inventors: Richard S. Robinson, Belle Mead, NJ (US); Timothy E. Bruce, Somerset, NJ (US); John P. Curtis, Phillipsburg, NJ (US); Donna M. Vroom, Kendall Park, NJ (US); Bernie P. Blackwell, Ringoes, NJ (US); Poul Nϕrgaard Poulsen, Aarhus (DK); Lars Gyldenvang, Hedensted (DK)

(73) Assignee: Colgate Palmolive Company, New York, NY (US)

( * ) Notice: Subject to any disclaimer, the term of this patent is extended or adjusted under 35 U.S.C. 154(b) by 0 days.

(21) Appl. No.: 09/886,756

(22) Filed: Jun. 21, 2001

(65) Prior Publication Data
US 2003/0007936 A1 Jan. 9, 2003

(51) Int. Cl.$^7$ .................................................. A61K 9/68
(52) U.S. Cl. ........................... 424/48; 424/49; 424/439; 424/440; 424/641; 424/643
(58) Field of Search ............................ 424/48, 49, 439, 424/440, 641, 643

(56) References Cited

U.S. PATENT DOCUMENTS

| 4,150,112 A | | 4/1979 | Wagenknecht et al. ....... 424/48 |
| 5,015,466 A | * | 5/1991 | Parran et al. ................ 424/435 |
| 5,702,687 A | | 12/1997 | Miskewitz ................... 424/52 |
| 6,030,605 A | * | 2/2000 | D'Ameila et al. .......... 424/440 |

FOREIGN PATENT DOCUMENTS

| EP | 309414 | * | 3/1989 | .................. 424/78 |
| WO | 0249448 | | 12/2001 | ............ A23G/3/30 |

* cited by examiner

Primary Examiner—James M. Spear
Assistant Examiner—Charesse Evans
(74) Attorney, Agent, or Firm—Paul Shapiro

(57) ABSTRACT

A chewing gum composition for controlling malodorous breath when chewed comprising a gum base having present therein a breath freshening amount of a water soluble zinc ion releasing salt and a phosphate salt mixture of alkali metal pyrophosphate and polyphosphate salts at a weight ratio of about 2:1 to 1:3 whereby the presence of the phosphate salt mixture enhances and extends the release of the zinc ion during the period of chewing.

13 Claims, No Drawings

CHEWING GUM TO CONTROL MALODOROUS BREATH

BACKGROUND OF THE INVENTION

1. Field of the Invention

The present invention relates to chewing gum. More particularly the invention relates to chewing gum containing an effective deodorizing amount of a water soluble zinc ion releasable salt formulated with a mixture of polyphosphate salts to enhance and extend the release of the zinc ion throughout the chewing period thereby providing long-term breath protection.

2. The Prior Art

Formation of volatile sulfur compounds in the mouth is a major cause of oral malodor. Most products like mouthwashes, toothpaste and breath sprays are able to cover up offensive breath odor for very short periods of time. This is due to the fact that these products do not stay in the mouth long enough to offer the maximum clinical benefit. Although the presence of deodorizing agents such as zinc ions is known to the art to be effective in reducing oral malodor in product forms like rinses and lozenges, it is more effective in a chewing gum given that the average chewing time for gum is approximately 20 minutes, the longer contact time enabling the chewing gum to serve as a very convenient, effective and efficient delivery vehicle for the zinc ion.

Although brushing the teeth with a toothbrush and dentifrice is a widely recognized technique for maintaining dental health, chewing gum has over the years been advocated as a possible adjunct for cleaning the teeth because people find the chewing of gum very pleasurable and chew gum for much longer periods of time than they brush their teeth. Chewing gum is especially advantageous for use in circumstances where toothbrushing is not possible or convenient, such as after lunch, while traveling, or during working hours.

Chewing gums in various forms such as slab, stick, tablet, block or ball shapes, and methods for producing the same, are known in the art. Conventional chewing gum generally includes a gum base to which is added water-soluble sweeteners, emulsifiers, mono-and di-glycerides, flavorings and colorants. For example, the water-soluble sweeteners typically include various sugars such as sucrose and dextrose, corn syrup, sorbitol and/or artificial sweeteners such as sodium or calcium saccharin, syclamates and aspartame.

The use of a chewing gum product to deliver active materials that is, using a gum base as a carrier for the active materials such as zinc ions, is also known to the art.

U.S. Pat. No. 4,150,112 discloses a chewing gum which moderates dental plaque which comprises from about 10 to about 95% by weight of a gum base and from about 0.001 to about 20% by weight of a mixture of an alkyl sulfate salt and zinc ion releasable compounds and a plaque inhibiting flavor selected from the group consisting of cinnamon oil, peppermint oil, and spearmint oil.

U.S. Pat. No. 5,702,687 discloses a chewing gum product for improved dental health comprising a gum base, dispersed particles of organic encapsulated sodium bicarbonate, a bulking sweetener, a plaque-inhibiting ingredient, zinc and polyphosphate compounds and a flavorant. Abrasives such as calcium phosphate, silica xerogel may also be included in the chewing gum composition.

The use in chewing gum of soluble zinc salts to control breath malodor has the disadvantage, that the soluble ingredient is masticated away from the gum rather quickly, that is, within a few minutes of chewing. What is therefore needed in the art is an improved chewing gum exhibiting breath freshening efficacy which affords long-term breath protection.

SUMMARY OF THE INVENTION

The chewing gum composition of the present invention has a gum base which is masticated by the user. Combined with the gum base is a water soluble zinc salt and a mixture of pyrophosphate and tripolyphosphate salts at a weight ratio of 2:1 to 1:3 and preferably 1 to 1.

The chewing gum composition of the present invention achieves the desirable effect of prolonged release of zinc ion from water soluble zinc salts over an extended period of time, on the order of 20 to 25 minutes during chewing of the gum. The chewing of the gum brings about a slow, linear release of the zinc ion whereby the deodorizing effect of the zinc is extended throughout the chewing period.

DETAILED DESCRIPTION OF THE INVENTION

Zinc ion releasable compounds useful in the practice of the present invention included water soluble zinc salts including zinc chloride, zinc acetate, zinc citrate and zinc gluconate. The zinc salt is present in the chewing gum of the present invention at concentrations of about 0.05 to about 1% by weight and preferably about 0.1 to about 0.5% by weight.

Polyphosphate salts include water soluble alkali metal tripolyphosphates such as sodium tripolyphosphate and potassium tripolyphosphate. Phosphate salts useful in the practice of the present invention include water soluble pyrophosphate salts such as dialkali or tetraalkali metal pyrophosphate salts such as $Na_4P_2O_7$ (TSPP), $K_4P_2O_7$, $Na_2K_2P_2O_7$, $Na_2P_2O_7$ and $K_2H_2P_2O_7$. Sodium pyrophosphate and polyphosphate salts are each incorporated in the chewing gum composition of the present invention at a concentration of about 0.5 to about 5.0% by weight, and preferably about 1.0 to about 3% by weight of the chewing gum.

It is critical to the practice of the present invention that a mixture of pyrophosphate and polyphosphate salts be present in the chewing gum composition in order for the slow release of zinc ion to occur during mastication of the chewing gum and that the weight ratio of pyrophosphate to polyphosphate salt be in the range of 2:1 to 1:3, and preferably 1:1 to 1:2.

In addition to the water soluble zinc and pyrophosphate and polyphosphate salts, the chewing gum composition of the present invention may contain additional ingredients found in conventional chewing gum compositions, and in conventional amounts. The chewing gum of the present invention is preferably a sugarless chewing gum since sugarless gums do not promote tooth decay. Chewing gum formulations are well known in the art and typically contain, in addition to, a chewing gum base, one or more plasticizing agents; at least one sweetening agent and at least one flavoring agent.

Gum base materials suitable for use in the practice of this invention are well known in the art and include natural or synthetic gum bases or mixtures thereof. Representative natural gums or elastomers include chicle, natural rubber, jelutong, balata, guttapercha, lechi caspi, sorva, guttakay, crown gum, perillo, or mixtures thereof. Representative synthetic gums or elastomers include butadiene-styrene copolymers, polyisobutylene and isobutylene-isoprene copolymers.

Plasticizing/softening agents commonly used in chewing gum compositions are suitable for use in this invention, including gelatin, waxes and mixtures thereof in amounts of 0.1 to 5% by weight.

The sweetening agent ingredient used in the practice of this invention may be selected from a wide range of materials. Bulk sweeteners such as maltose including partially hydrolyzed starch, corn syrup solids and sugar alcohols such as sorbitol, xylitol, mannitol and mixtures thereof, and high intensity artificial sweeteners such as the soluble saccharin salts, i.e., sodium or calcium saccharin salts, cyclamate salts, such as the sodium salt and the like, and the free acid form of saccharin; dipeptide based sweetening agents such as L-aspartyl-L-phenyl-alanine methyl ester and acesulfame potassium. The bulk sweetener is present in the chewing gum composition of the present invention in amounts of about 40 to about 80% by weight and preferably about 50 to about 75% by weight. The high intensity artificial sweetener is present in the chewing gum composition of the present invention in amounts of about 0.1 to about 2% by weight and preferably about 0.3 to 1% by weight.

In addition to the ingredients listed above, the gum compositions may also contain conventional additives such as colorants, flavoring agents and the like. For example, titanium dioxide may be utilized as a colorant. A variety of flavors known in the art may be used, including essential oils, such as cinnamon, spearmint, peppermint, menthol, birch, anise and the like; natural fruit flavors derived from the essence of fruits, such as apple, pear, peach, strawberry, cherry, apricot, orange, watermelon, banana and the like; bean-derived flavors, such as coffee, cocoa and the like. Flavoring agents are incorporated in the chewing gum formulation at a concentration of about 0.5 to about 5% by weight and preferably 1 to 3% by weight.

A sample procedure for formulating the chewing gum composition is as follows: the gum base is first melted in a heated kettle at 55°–65° C. One or more of the sweeteners are then added to the gum base followed by one or more flavors, zinc and phosphate salts and plasticizer. All ingredients are then mixed for a sufficient period of time to ensure adequate dispersion. The mixture is then allowed to cool and is cut into suitable serving sizes.

The following examples are further illustrate to he present invention, but it is understood that the invention is not limited thereto. All amounts and proportions referred to herein and the appended claims are by weight.

EXAMPLE

A chewing gum designated Chewing Gum A was prepared containing the water soluble zinc salt, zinc gluconate and a mixture of pyrophosphate and polyphosphate salts at a weight ratio of 1:1. The ingredients of Chewing Gum A are listed in Table I below.

For purposes of comparison, Chewing Gums B and C were prepared having the same ingredients as Chewing Gum A except, B had an additional 2% sorbitol to replace the 1:1 mixture of tetrasodium pyrophosphate and sodium tripolyphosphate and Chewing Gum C had an additional 1% sorbitol to replace the sodium bicarbonate.

TABLE I

| Ingredients | Wt. % |
|---|---|
| Gum base | 28.23 |
| Sorbitol | 28.98 |
| Aspertame | 0.30 |
| Acesulfame-K | 0.08 |
| Malitol | 29.94 |
| Xylitol | 5.01 |
| Flavor | 1.82 |
| Zinc gluconate | 0.18 |
| Tetrasodium pyrophosphate | 1.0 |
| Sodium tripolyphosphate | 1.0 |
| Na bicarbonate | 1.0 |
| Titanium dioxide | 0.32 |
| Gelatin | 1.24 |
| Carnauba wax | 0.03 |

To determine the zinc ion release properties of Chewing Gums A, B and C during chewing, a mastication device of the type described in Kleber et al, J. Dent. Res. 60:109:114 (1981) designed to simulate human mastication of chewing gum, was used to extract zinc from the test chewing gum. For testing, a tooth specimen was placed both in the upper and lower tooth holders of the instrument. Then 15 ml of freshly stimulated human saliva arising from paraffin chewing was placed in the reservoir of the device and warned to 37° C. The saliva and chewing gum were maintained at body temperature for proper chewing consistency during mechanical mastication when the saliva reached the proper temperature, 3 pieces (approximately 5 grams) of chewing gum were inserted between the positioning paddles directly over the lower tooth specimen, the test teeth were treated with the chewing gum for 5–20 minutes, the average time that gum is normally chewed. Samples for analysis at time intervals of 5, 10 and 20 minutes. The results are recorded in Table II below.

TABLE II

| | % Released (Average of) | | |
|---|---|---|---|
| | % Release of ionic zinc* Time (minutes) | | |
| Chewing Gum | 5 | 10 | 20 |
| A | 38.69 | 42.83 | 44.75 |
| B | 86.52 | 94.86 | 98.34 |
| C | 85.33 | 93.89 | 97.54 |

*Average of three runs.

The results recorded in Table II demonstrate that the release of zinc ion from the chewing gum of the present invention (Chewing Gum A) was significantly less than zinc ion released by comparative chewing gums (Chewing Gums B, C).

What is claimed is:

1. A chewing gum composition for controlling malodorous breath when chewed comprising a gum base having present therein a breath freshening amount of a water soluble zinc ion releasing salt and a phosphate salt mixture of alkali metal pyrophosphate and polyphosphate salts at a weight ratio of about 2:1 to 1:3 whereby the presence of the phosphate salt mixture enhances and extends the release of the zinc ion during the period of chewing.

2. The chewing gum of claim 1 wherein the zinc ion releasing salt is zinc gluconate.

3. The chewing gum of claim 1 wherein the pyrophosphate salt is tetra sodium pyrophosphate.

4. The chewing gum of claim 1 wherein the polyphosphate salt is sodium tripolyphosphate.

5. The chewing gum of claim 1 wherein the zinc ion releasing agent is present in the chewing gum in an amount of about 0.05 to about 1% by weight.

6. The chewing gum of claim 1 wherein the individual pyrophosphate and polyphosphate salts are present in the chewing gum in an amount of about 0.1 to about 5% by weight.

7. The process for controlling malodorous breath by the mastication of the chewing gum of claim 1.

8. A method for preparing a chewing gum effective to control malodorous breath comprising (a) preparing a chewing gum base (b) incorporating in the chewing gum base a breath freshening amount water soluble zinc ion releasing salt and a mixture of alklai metal pyrophosphate and polyphosphate salts at a weight ratio of about 2:1 to 1:3 whereby the presence of the salt mixture enhances and extends the release of the zinc ion during the period of chewing.

9. The method of claim 8 wherein the water soluble zinc ion releasing agent is zinc gluconate.

10. The method of claim 8 wherein the pyrophosphate salt is tetra sodium pyrophosphate.

11. The method of claim 8 wherein the polyphosphate salt is sodium tripolyphosphate.

12. The method of claim 8 wherein the zinc ion releasing salt is present in the chewing gum in an amount of about 0.05 to about 1% by weight.

13. The method of claim 8 wherein the individual pyrophosphate and polyphosphate salts are present in the chewing gum in an amount of about 0.1 to about 5% by weight.

* * * * *

UNITED STATES PATENT AND TRADEMARK OFFICE
CERTIFICATE OF CORRECTION

PATENT NO.     : 6,592,849 B2
DATED          : July 15, 2003
INVENTOR(S)    : Richard S. Robinson et al.

It is certified that error appears in the above-identified patent and that said Letters Patent is hereby corrected as shown below:

Title page,
Item [73], Assignee, should read:
-- Colgate Palmolive Company, New York, New York, USA and
   Dandy A/S, Denmark --

Signed and Sealed this

Ninth Day of November, 2004

JON W. DUDAS
*Director of the United States Patent and Trademark Office*